United States Patent Office 3,736,330
Patented May 29, 1973

---

3,736,330
BIOCIDALLY ACTIVE CARBOXAMIDE DERIVATIVES
Pieter Ten Haken, Herne Bay, Kent, England, assignor to Shell Oil Company, New York, N.Y.
No Drawing. Filed Apr. 19, 1971, Ser. No. 135,389
Claims priority, application Great Britain, Apr. 15, 1970, 17,956/70
Int. Cl. C07d 91/34
U.S. Cl. 260—306.8 R    2 Claims

ABSTRACT OF THE DISCLOSURE

Certain novel fungicidal carboxamide derivatives having the formula

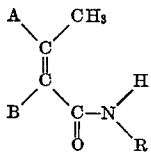

wherein R represents one of certain heterocyclic moieties containing at least one nitrogen atom, A represents alkyl and B represents hydrogen or A and B together with the indicated carbon atoms forms a benzene ring or a hetero ring containing oxygen.

---

This invention relates to novel carboxamide derivatives which possess fungicidal properties.

The invention provides carboxamide derivatives having the general formula:

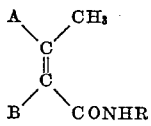

wherein R represents pyridyl, pyrimidinyl, thiazolyl or triazolyl, optionally substituted by from one to two of bromine, $C_1$–$C_3$ alkyl, alkylthio or alkylsulfonyl, preferably methyl, methylthio or methylsulfonyl, A represents $C_1$–$C_3$ alkyl (preferably methyl) and B represents hydrogen, or A and B together with the two carbon atoms to which they are linked jointly represent a benzene, furan, thiazole, dihydropyran or dihydrooxathiin ring, optionally substituted by 1 or 2 $C_1$–$C_3$ alkyl.

A particularly preferred compound of this class is 3-methyl-N-(thiazol-2-yl)crotonamide.

The carboxamide derivatives of the invention can be prepared by reacting an acid halide of the formula

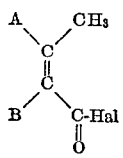

wherein Hal represents a halogen, suitably chlorine, atom, with the appropriate primary amine, preferably in the presence of a hydrogen halide acceptor, for example a tertiary amine such as triethylamine or pyridine. The reaction may optionally be carried out in an organic diluent, for example a hydrocarbon such as benzene or xylene or a chlorinated hydrocarbon such as dichloroethane.

Carboxamide derivatives of the invention show both direct and systemic activity against a wide range of fungal diseases of plants. The invention includes therefore within its scope fungicidal compositions comprising a carrier or a surface-active agent or both a carrier and a surface-active agent together with, as active ingredient, at least one carboxamide derivative of the invention. Likewise the invention includes also a method of protecting crops from attack by fungi, in which crops subject to or subjected to such attack, seeds of such crops or soil in which such crops are growing or are to be grown are treated with a fungicidally effective amount of a carboxamide derivative or composition of the invention.

The term "carrier" as used herein means a material, which may be inorganic or organic and of synthetic or natural origin, with which the active compound is mixed or formulated to facilitate its application to the plant, seed, soil or other object to be treated, or its storage, transport or handling. The carrier may be a solid or a fluid. Any of the material usually applied in formulating fungicides may be used as carrier.

Suitable solid carriers are natural and synthetic clays and silicates for example natural silicas such as diatomacious earths; magnesium silicates, for example, talcs; magnesium aluminum silicates, for example, attapulgites and vermiculites; aluminum silicates, for example, kaolinites, montmorillonites and micas; calcium carbonates; calcium sulphate; synthetic hydrated silicon oxides and synthetic calcium or aluminium silicates; elements such as for example, carbon and sulphur; natural and synthetic resins such as for example, coumarone resins, polyvinyl chloride and styrene polymers and copolymers; solid polychlorophenols; bitumen; waxes; and solid fertilisers, for example superphosphates.

Examples of suitable fluid carriers are water, alcohols, such as for example, isopropanol, glycols; ketones such as for example, acetone, methyl ethyl ketone, methyl isobutyl ketone and cyclohexanone; ethers; aromatic hydrocarbons such as for example, benzene, toluene and xylene; petroleum fractions such as for example, kerosine, light mineral oils; chlorinated hydrocarbons, such as for example, carbon tetrachloride, perchloroethylene, trichloroethane, including liquefied normally vaporous gaseous compounds. Mixtures of different liquids are often suitable.

The surface active agent may be an emulsifying agent or a dispersing agent or a wetting agent; it may be non-ionic or ionic. Any of the surface-active agents usually applied in formulating fungicides may be used. Examples of suitable surface-active agents are the sodium or calcium salts of polyacrylic acids and lignin sulphonic acids; the condensation products of fatty acids or aliphatic amines or amides containing at least 12 carbon atoms in the molecule with ethylene oxide and/or propylene oxide; fatty acid esters or glycerol, sorbitan, sucrose or pentaerythritol; condensates of these with ethylene oxide and/or propylene oxide; condensation products of fatty alcohols or alkyl phenols for example p-octylphenol or p-octylcresol, with ethylene oxide and/or propylene oxide; sulphates or sulphonates of these condensation products; alkali or alkaline earth metal salts, preferably sodium salts, of sulphuric or sulphonic acid esters containing at least 10 carbon atoms in the molecule, for example, sodium lauryl sulphate, sodium secondary alkyl sulphates, sodium salts or sulphated castor oil, and sodium alkylaryl sulphonates such as sodium dodecylbenzene sulphonate; and polymers of ethylene oxide and copolymers of ethylene oxide and propylene oxide.

The compositions of the invention may be formulated as wettable powders, dusts, granules, solutions, emulsifiable concentrates, emulsions, suspension concentrates and aerosols. Wettable powders are usually compounded to contain 25, 50, or 75% w. of toxicant and usually contain, in addition to solid carrier, 3–10% w. of a dispersing agent and, where necessary, 0–10% w. of stabiliser(s) and/or other additives such as penetrants or stickers. Dusts are usually formulated as a dust concentrate having a similar composition to that of a wettable powder but without a dispersant, and are diluted in the field with further solid carrier to give a composition usually containing ½–10% w. of toxicant. Granules are usually prepared to have a size between 10 and 100 BS mesh, and may be manufactured by agglomeration or impregnation techniques. Generally, granules will contain ½–25% w. toxicant and 0–10% w. of additives such as stabilisers, slow release modifiers and binding agents. Emulsifiable concentrates usually contain, in addition to the solvent and, when necessary, co-solvent, 10–50% w./v. toxicant, 2–20% w./v. emulsifiers and 0–20% w./v. of appropriate additives such as stabilisers, penetrants and corrosion inhibitors. Suspension concentrates are compounded so as to obtain a stable, non-sedimenting, flowable product and usually contain 10–75% w. toxicant, 0.5–15% w. of dispersing agents, 0.1–10% w. of suspending agents such as protective colloids and thixotropic agents, 0–10% w. of appropriate additives such as defoamers, corrosion inhibitors, stabilisers, penetrants and stickers, and as carrier, water or an organic liquid in which the toxicant is substantially insoluble; certain organic solids or inorganic salts may be dissolved in the carrier to assist in preventing sedimentation or as antifreeze agents for water.

The compositions of the invention may contain other ingredients, for example, protective colloids such as gelatin, glue, casin, gums, cellulose ethers, and polyvinyl alcohol; thixotropic agents e.g. bentonites, sodium polyphosphates; stabilisers such as ethylene diamine tetraacetic acid, urea, triphenyl phosphate; other fungicides or pesticides; and stickers, for example non-volatile oils.

Aqueous dispersion and emulsions, for example, compositions obtained by diluting a wettable powder or an emulsifiable concentrate according to the invention with water, also lie within the scope of the present invention. The said emulsions may be of the water-in-oil or of the oil-in-water type, and may have a thick "mayonnaise-like consistency.

The invention is further illustrated in the following examples, in which "parts" means parts by weight unless otherwise expressly indicated. In these examples, the products were identified by means of elemental, infra-red spectrum and/or nuclear magnetic resonance spectrum analyses.

EXAMPLE I 2-methyl-N-(pyridin-2-yl) benzamide o-Toluyl chloride (18.6 parts) was added dropwise to a solution of 2-aminopyridine (9.4 parts) in pyridine (100 parts by volume) at 0–5° C. over a period of 1 hour. Stirring was continued for a further one hour at 0–5° C. The mixture was allowed to stand at room temperature for 16 hours, and was then poured onto ice (300 parts). The solid precipitate obtained was filtered off and recrystallized from ethanol to give the desired product having a melting point of 117–119° C.

EXAMPLES 2–39

Following procedures similar to that given in Example I, further compounds of the invention described in Table I were prepared.

TABLE I

| Ex. No. | Compound | Melting point, ° C. |
|---|---|---|
| 2 | 2-methylfuran-3-(N-(pyrimidin-2-yl))carboxamide | 122–125 |
| 3 | 2-methylfuran-3-(N-(pyridin-2-yl))carboxamide | 68–70 |
| 4 | 2-methyl-5,6-dihydro-1,4-oxathiin-3-(N-(pyrimidin-2-yl))carboxamide | 171–173 |
| 5 | 3-methyl-N-(pyridin-2-yl)crotonamide | 125–126.5 |
| 6 | 2-methyl-5,6-dihydropyran-3-(N-(pyrimidin-2-yl))carboxamide | 110–113 |
| 7 | 2-methyl-5,6-dihydropyran-3-(N-(pyridin-2-yl))carboxamide | 79–82 |
| 8 | 2-methylfuran-3-(N-(thiazol-2-yl))carboxamide | 164 |
| 9 | 2-methyl-N-(pyrimidin-2-yl)benzamide | 107–109 |
| 10 | 2-methylfuran-3-(N-(pyridin-4-yl))carboxamide | 171–173 |
| 11 | 2-methyl-N-(pyridin-4-yl)benzamide | 128–130 |
| 12 | 2-methyl-N-(1,2,4-triazol-3-yl)benzamide | 174–176 |
| 13 | 3-methyl-N-(pyrimidin-2-yl)crotonamide | 115.5–117.5 |
| 14 | 2-methyl-N-(pyridin-3-yl)benzamide | 106.5–108.5 |
| 15 | 2-methylfuran-3-(N-(pyridin-3-yl))carboxamide | 123–126 |
| 16 | 3-methylfuran-2-(N-(pyrimidin-2-yl))carboxamide | 81–82 |
| 17 | 2,4-dimethyl-N-(pyrimidin-2-yl)benzamide | 113–115 |
| 18 | 3-methyl-N-(thiazol-2-yl)crotonamide | 163.5–164.5 |
| 19 | 2,4-dimethyl-N-(pyridin-2-yl)benzamide | 125–127 |
| 20 | 2,5-dimethylfuran-3-(N-(pyridin-2-yl))carboxamide | 91–93 |
| 21 | 2,5-dimethylfuran-3-(N-(pyrimidin-2-yl))carboxamide | 113.5–116 |
| 22 | 2,4,6-trimethyl-N-(pyrimidin-2-yl)benzamide | 151–153 |
| 23 | 2,4,6-trimethyl-N-(pyridin-2-yl)benzamide | 148–150 |
| 24 | 2-methyl-5,6-dihydro-1,4-oxathiin-3-(N-(thiazol-2-yl))carboxamide | 114–116 |
| 25 | 2,5-dimethylfuran-3-(N-(thiazol-2-yl))carboxamide | 171–172 |
| 26 | 2-methyl-5,6-dihydro-1,4-oxathiin-3-(N-(4-methylthiazol-2-yl)carboxamide | 121 |
| 27 | 3-methyl-N-(4-methylthiazol-2-yl)crotonamide | 109–110 |
| 28 | 2,5-dimethylfuran-3-(N-(4-methylthiazol-2-yl))carboxamide | 150–152 |
| 29 | 2-methyl-5,6-dihydropyran-3-(N-(thiazol-2-yl))carboxamide | 129.5–131.5 |
| 30 | 2-methyl-5,6-dihydropyran-3-(N-(4-methylthiazol-2-yl)carboxamide | 105.5–107.5 |
| 31 | 2,5-dimethylfuran-3-(N-(5-bromo-4-methylthiazol-2-yl)carboxamide | 164–167 |
| 32 | 2-methyl-5,6-dihydropyran-3-(N-(5-bromo-4-methyl-thiazol-2-yl))carboxamide | 159.5–161.5 |
| 33 | 2,5-dimethylfuran-3-(N-(4-methyl-5-methylthiothiazol-2-yl))carboxamide | 106–108 |
| 34 | 2,5-dimethylfuran-3-(N-(4-methyl-5-methylsulphonyl-thiazol-2-yl))carboxamide | 228–230 |
| 35 | 2-methyl-5,6-dihydropyran-3-(N-4-methyl-5-methyl-thiothiazol-2-yl))carboxamide | 116–118 |
| 36 | 3-methyl-N-(5-bromo-4-methylthiazol-2-yl)crotonamide | 175–177 |
| 37 | 2-methyl-N-(5-bromo-4-methylthiazol-2-yl)benzamide | 171–173 |
| 38 | 2-methyl-N-(4'methyl-5-methylthiothiazol-2-yl)crotonamide | 157–158 |
| 39 | 2-methyl-N-(4-methyl-5-methylsulphonylthiazol-2-yl)crotonamide | 183–185 |

EXAMPLES 40–67

The fungicidal activity of compounds of the invention was investigated by one or more of the following tests.

(1) Direct activity

Intact leaves or leaf pieces of vine, potato, wheat, cucumber and broad bean were supported on water-saturated seed germination pads in petri dishes and were sprayed with aqueous suspensions containing 1000 parts per million of the test compound. The leaves or leaf pieces were allowed to dry and were then inoculated with spores of *Plasmopara victicola* (vine downy mildew), *Phytophthora infestans* (potato late blight), *Puccina recondita* (brown wheat rust), *Erysiphe cichoracearum* (cucumber powdery mildew) and *Uromyces fabae* (broad bean rust) respectively. Observations on the development of disease symptoms were made after 2–7 days.

(2) Foliar spray tests

Aqueous solutions or suspensions containing 0.25% of the test chemical, 5% acetone, 0.1% glycerol and 0.005% Triton X-100 were sprayed onto selected leaf surfaces of two plant species. Each treatment was triplicated.

(i) Broad bean plants were sprayed on the upper and lower surfaces of their first and second difoliate leaves, leaving the third expanded leaf unsprayed. Two days after treatment the plants were inoculated with spores of *Uromyces fabae* and observations on the development of the rust-symptoms were made after a further 8 days.

(ii) Cucumber plants were sprayed on the upper surfaces of the first leaf and the lower surface of the second leaf leaving the third and fourth leaves unsprayed. The upper surfaces of all leaves were inoculated with spores of

TABLE II

| Example Number | Compound of example number | Direct activity | | | | | Foliar spray tests | | | | Root treatment tests | |
|---|---|---|---|---|---|---|---|---|---|---|---|---|
| | | | | | | | E. cichoracearum | | U. fabae | | | |
| | | P.v. | P.i. | P.r. | E.c. | U.f. | Direct | Systemic | Direct | Systemic | P. recondita | P. oryzae |
| 40 | 9 | --- | 0 | 2 | 2 | --- | 1 | 1 | 0 | 0 | 2 | 0 |
| 41 | 1 | 1 | 2 | 0 | 1 | --- | 0 | 0 | 0 | 0 | 2 | --- |
| 42 | 2 | 1 | 1 | 0 | 2 | --- | 0 | 0 | 1 | 0 | 2 | --- |
| 43 | 3 | 0 | 0 | 0 | 0 | --- | 0 | 0 | 0 | 0 | 2 | --- |
| 44 | 5 | 2 | 0 | --- | 2 | --- | 0 | 0 | 0 | 0 | 0 | 0 |
| 45 | 4 | 0 | 0 | 2 | 0 | --- | 0 | 0 | 0 | 0 | 0 | 0 |
| 46 | 7 | 0 | 0 | --- | 1 | --- | 1 | 1 | 1 | 0 | 0 | --- |
| 47 | 6 | 1 | 1 | --- | 2 | --- | 2 | 1 | 0 | 0 | 1 | 0 |
| 48 | 8 | 2 | 2 | --- | 2 | --- | 2 | 1 | 0 | 0 | 1 | 0 |
| 49 | 10 | 2 | 0 | --- | 1 | --- | 0 | 0 | 0 | 0 | --- | 1 |
| 50 | 11 | 2 | 2 | --- | 2 | --- | 0 | 0 | 0 | 0 | --- | 0 |
| 51 | 12 | 1 | 2 | --- | 0 | --- | 1 | 1 | 0 | 0 | --- | 1 |
| 52 | 14 | 0 | 0 | --- | 2 | 2 | 1 | 0 | 0 | 0 | 0 | 0 |
| 53 | 16 | --- | 0 | 2 | 2 | --- | 1 | 0 | 1 | 0 | 0 | 0 |
| 54 | 17 | --- | 0 | 2 | 2 | --- | 1 | 0 | 0 | 0 | 2 | 0 |
| 55 | 18 | 2 | 2 | 2 | 2 | --- | 2 | 0 | 0 | 0 | 2 | 2 |
| 56 | 20 | 2 | 0 | 2 | 2 | --- | 1 | 0 | --- | --- | 0 | 0 |
| 57 | 22 | --- | 0 | 2 | 0 | --- | 0 | 0 | 0 | 0 | 0 | 0 |
| 58 | 23 | --- | 0 | 2 | 0 | --- | 0 | 0 | 0 | 0 | 0 | 0 |
| 59 | 24 | 0 | 1 | 2 | 0 | --- | 0 | 0 | 1 | 0 | 0 | 0 |
| 60 | 25 | 0 | 1 | 0 | 0 | --- | 1 | 0 | 2 | 0 | 0 | 0 |
| 61 | 27 | 2 | 0 | 2 | 2 | --- | 2 | 0 | 1 | 1 | 1 | 0 |
| 62 | 29 | 2 | 0 | 0 | 0 | --- | 0 | 0 | 0 | 0 | 2 | 1 |
| 63 | 30 | 2 | 0 | 2 | 2 | --- | 2 | 0 | 0 | 0 | 2 | 1 |
| 64 | 34 | 2 | 0 | 1 | 0 | --- | 0 | 0 | 0 | 0 | 0 | 0 |
| 65 | 35 | --- | 0 | 0 | 0 | --- | 0 | 0 | 1 | 0 | 1 | 0 |
| 66 | 36 | --- | 1 | 0 | 2 | --- | 2 | 0 | 0 | 0 | 0 | 0 |
| 67 | 38 | --- | 0 | 0 | 2 | --- | 2 | 0 | 0 | 0 | 0 | 0 |

*Erysiphe cichoracearum* 2 days after treatment. Assessments of the fungal infections were made 10 days after inoculation.

(3) Root treatment tests (i) A quantity of 12 milligrams of the finely ground test compound was applied to the surface of each of three soil samples contained in separate 55 centimeter diameter pots. The soil samples were then sown each with 12 wheat seeds which were covered with soil and allowed to grow for 10 days. The resulting plants were then inoculated with spores of *Puccina recondita* (brown rust) and observations on the development of the fungus were made after 7 days.

(ii) Rice plants were grown from seed in soil contained in 75 centimeter diameter pots. After 8 days the soil was drenched with 50 milliliters of an aqueous solution or suspension containing 250 parts per million of the test compound. Two days after drenching the plants were inoculated with spores of *Pyricularia oryzae*, (rice blast). Observations on the development of the disease were made after a further 6 days.

The results of these tests are set out in Table II, in which a result 2 indicates more than 80% control of the fungus, a result 1 indicates 50–80% control and a result 0 indicates less than 50% control.

I claim as my invention:

1. A compound of the formula

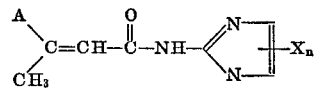

wherein A is $C_1$–$C_3$ alkyl, X is bromine, $C_1$–$C_3$ alkyl, $C_1$–$C_3$ alklthio or $C_1$–$C_3$ alkylsulfonyl and $n$ is 0, 1 or 2.

2. A compound according to claim 1 wherein A is methyl and $n$ is 0.

References Cited

UNITED STATES PATENTS 3,515,538  6/1970  Ugno et al. _____ 260—306.8 R

ALEX MAZEL, Primary Examiner

R. J. GALLAGHER, Assistant Examiner

U.S. Cl. X.R.

260—256.4 N, 256.5 R, 294.8 G, 294.8 D, 295 AM, 308 R; 424—251, 263, 269, 270

UNITED STATES PATENT OFFICE
CERTIFICATE OF CORRECTION

Patent No. 3,736,330                    Dated May 29, 1973

Inventor(s) Pieter Ten Haken

It is certified that error appears in the above-identified patent and that said Letters Patent are hereby corrected as shown below:

Claim 1 at column 6, line 35, delete the formula shown and in its place insert the following formula --

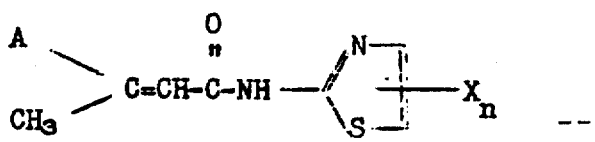

--

Signed and sealed this 25th day of June 1974.

(SEAL)
Attest:

EDWARD M. FLETCHER, JR.          C. MARSHALL DANN
Attesting Officer                 Commissioner of Patents